US009519805B2

(12) United States Patent
Arya et al.

(10) Patent No.: US 9,519,805 B2
(45) Date of Patent: Dec. 13, 2016

(54) DIGEST OBFUSCATION FOR DATA CRYPTOGRAPHY

(71) Applicant: Cellco Partnership, Arlington, VA (US)

(72) Inventors: Siddhartha Kumar Arya, Cumming, GA (US); Edward Robert Zoltan Erdey, Cumming, GA (US)

(73) Assignee: Cellco Partnership, Basking Ridge, NJ (US)

( * ) Notice: Subject to any disclaimer, the term of this patent is extended or adjusted under 35 U.S.C. 154(b) by 626 days.

(21) Appl. No.: 13/956,739

(22) Filed: Aug. 1, 2013

(65) Prior Publication Data

US 2015/0039902 A1 Feb. 5, 2015

(51) Int. Cl.
G06F 21/62 (2013.01)
G06F 21/60 (2013.01)
G06F 7/74 (2006.01)
G06F 21/71 (2013.01)
G06F 7/24 (2006.01)

(52) U.S. Cl.
CPC ............... *G06F 21/71* (2013.01); *G06F 7/74* (2013.01); *G06F 21/6254* (2013.01); *G06F 7/24* (2013.01); *G06F 21/602* (2013.01)

(58) Field of Classification Search
CPC .... G06F 21/71; G06F 21/6254; G06F 21/602; G06F 17/30; G06F 17/30091; G06F 17/30094; G06F 17/30097; G06F 17/30312; G06F 17/30321; G06F 17/30324; G06F 17/3033; G06F 17/30613; G06F 17/30619; G06F 17/30628; G06F 7/74; H04L 9/0643; H04L 9/3236

See application file for complete search history.

(56) References Cited

U.S. PATENT DOCUMENTS

| 5,526,472 | A | * | 6/1996 | Strohacker | 345/655 |
| 6,510,458 | B1 | * | 1/2003 | Berstis et al. | 709/219 |
| 7,627,609 | B1 | * | 12/2009 | Ozekinci et al. | |
| 7,801,308 | B1 | * | 9/2010 | Hang | 380/277 |
| 8,452,983 | B2 | * | 5/2013 | Lin | 713/190 |
| 8,972,337 | B1 | * | 3/2015 | Gupta | 707/602 |
| 2003/0002184 | A1 | * | 1/2003 | Hayami et al. | 360/29 |
| 2003/0028519 | A1 | * | 2/2003 | Burgess | 707/1 |
| 2003/0182291 | A1 | * | 9/2003 | Kurupati et al. | 707/100 |
| 2004/0243536 | A1 | * | 12/2004 | Jensen et al. | 707/1 |
| 2004/0243627 | A1 | * | 12/2004 | Jensen et al. | 707/104.1 |
| 2005/0002531 | A1 | * | 1/2005 | Michaelsen | 380/268 |

(Continued)

*Primary Examiner* — Eleni Shiferaw
*Assistant Examiner* — Nelson Giddins

(57) ABSTRACT

Execution of an obfuscation application may cause a computing device to translate bits of a hashed value according to a sparse bit selection pattern, the sparse bit pattern including a translation of bits of the hashed value into reordered bit unit groupings sized according to a numeric base of a digit cypher; and generate an obfuscated value using the translated bit unit groupings of the hashed value as indices into the digit cypher, the digit cypher including a mapping of the indices to output values in the numeric base. The obfuscation application may further cause the device to receive a target value to be obfuscated in data records received from a data source, hash the target value using a hashing module to create the hashed value, in some cases truncate the hashed value, and replace the target value in the data records with the obfuscated value.

15 Claims, 9 Drawing Sheets

(56) References Cited

U.S. PATENT DOCUMENTS

| | | | |
|---|---|---|---|
| 2005/0084110 A1* | 4/2005 | Palmer | 380/268 |
| 2006/0129501 A1* | 6/2006 | Pastusiak et al. | 705/65 |
| 2006/0212703 A1* | 9/2006 | Kojima | 713/175 |
| 2006/0212772 A1* | 9/2006 | Luo | 714/752 |
| 2006/0265593 A1* | 11/2006 | Momma et al. | 713/176 |
| 2008/0091954 A1* | 4/2008 | Morris et al. | 713/187 |
| 2008/0181103 A1* | 7/2008 | Davies | 370/230 |
| 2008/0294910 A1* | 11/2008 | Lin | 713/190 |
| 2009/0012957 A1* | 1/2009 | Villaret et al. | 707/6 |
| 2009/0083846 A1* | 3/2009 | Ding | 726/12 |
| 2009/0296850 A1* | 12/2009 | Xu et al. | 375/295 |
| 2009/0312093 A1* | 12/2009 | Walker et al. | 463/25 |
| 2010/0106756 A1* | 4/2010 | Ellison | 708/212 |
| 2010/0198846 A1* | 8/2010 | Gupta | 707/757 |
| 2010/0268966 A1* | 10/2010 | Leggette et al. | 713/193 |
| 2012/0042046 A1* | 2/2012 | Petersen et al. | 709/219 |
| 2012/0143835 A1* | 6/2012 | Aronovich et al. | 707/696 |
| 2013/0042108 A1* | 2/2013 | Cancedda | 713/168 |
| 2013/0204905 A1* | 8/2013 | Ioffe | 707/803 |
| 2014/0004816 A1* | 1/2014 | Udeshi et al. | 455/405 |
| 2014/0019731 A1* | 1/2014 | Anand et al. | 712/226 |
| 2014/0019771 A1* | 1/2014 | Emmett et al. | 713/189 |
| 2014/0074719 A1* | 3/2014 | Gressel et al. | 705/64 |
| 2014/0079213 A1* | 3/2014 | Jacobson et al. | 380/28 |
| 2014/0082582 A1* | 3/2014 | Houck et al. | 717/101 |
| 2014/0153715 A1* | 6/2014 | Georgiev et al. | 380/28 |
| 2014/0164352 A1* | 6/2014 | Denninghoff | 707/711 |
| 2014/0223196 A1* | 8/2014 | Ignomirello | 713/193 |
| 2014/0280239 A1* | 9/2014 | Georges et al. | 707/749 |
| 2014/0379763 A1* | 12/2014 | Jain | 707/812 |
| 2015/0039902 A1* | 2/2015 | Arya et al. | 713/189 |
| 2015/0236854 A1* | 8/2015 | Georgiev et al. | 380/28 |

\* cited by examiner

| Index | Output | Index | Output | Index | Output | Index | Output |
|---|---|---|---|---|---|---|---|
| 0 | 9 | 16 | j | 32 | T | 48 | 5 |
| 1 | 0 | 17 | W | 33 | 3 | 49 | v |
| 2 | G | 18 | h | 34 | L | 50 | B |
| 3 | H | 19 | E | 35 | I | 51 | V |
| 4 | X | 20 | r | 36 | i | 52 | R |
| 5 | x | 21 | e | 37 | n | 53 | m |
| 6 | Y | 22 | I | 38 | g | 54 | K |
| 7 | S | 23 | s | 39 | 2 | 55 | P |
| 8 | Q | 24 | w | 40 | 6 | 56 | t |
| 9 | Z | 25 | a | 41 | C | 57 | 7 |
| 10 | A | 26 | 1 | 42 | y | 58 | q |
| 11 | D | 27 | d | 43 | p | 59 | 8 |
| 12 | M | 28 | o | 44 | c | 60 | J |
| 13 | u | 29 | + | 45 | / | 61 | 4 |
| 14 | z | 30 | N | 46 | U | 62 | f |
| 15 | k | 31 | O | 47 | b | 63 | F |

Digit Cypher
112

FIG. 2

| Input Data Bit | Output Bit Unit | Bit Unit Location | Input Data Bit | Output Bit Unit | Bit Unit Location |
|---|---|---|---|---|---|
| 0 | F | 4 | 16 | D | 3 |
| 1 | C | 1 | 17 | G | 1 |
| 2 | H | 3 | 18 | H | 4 |
| 3 | D | 4 | 19 | A | 2 |
| 4 | B | 2 | 20 | G | 2 |
| 5 | G | 3 | 21 | B | 3 |
| 6 | B | 4 | 22 | C | 2 |
| 7 | A | 1 | 23 | D | 2 |
| 8 | D | 1 | 24 | E | 1 |
| 9 | G | 4 | 25 | A | 3 |
| 10 | E | 2 | 26 | E | 4 |
| 11 | C | 3 | 27 | F | 1 |
| 12 | E | 3 | 28 | C | 4 |
| 13 | A | 4 | 29 | F | 3 |
| 14 | H | 1 | 30 | H | 2 |
| 15 | F | 2 | 31 | B | 1 |

Sparse Bit Selection Pattern
114

FIG. 3

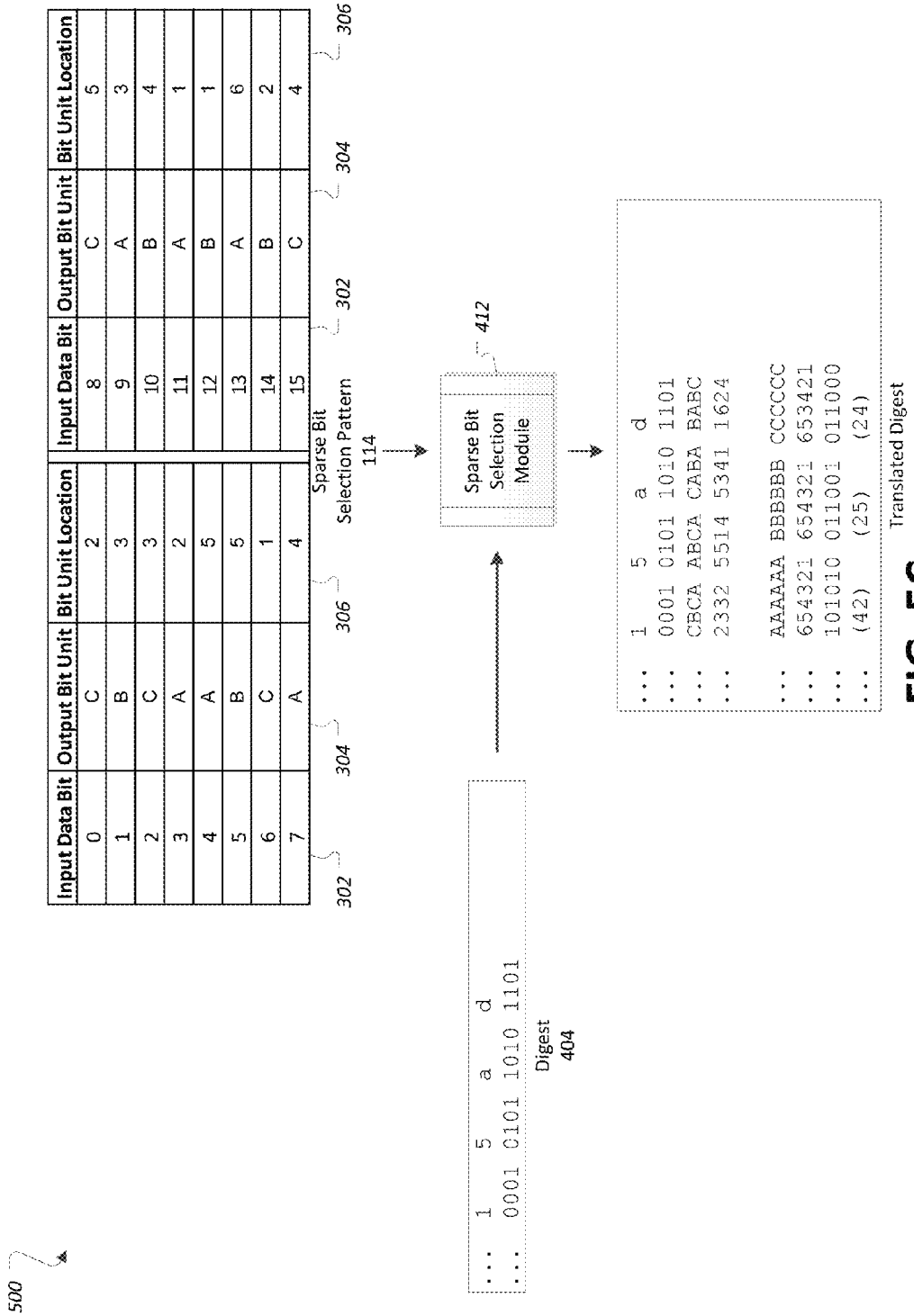

DIGEST OBFUSCATION FOR DATA CRYPTOGRAPHY

BACKGROUND

Data sets may include data elements that should be hashed to protect the included information. As some examples, personal or confidential information such as customer details, health information, tax identifiers, and social security numbers may be included in fields of a database. Due to the relative uniqueness of many of these types of fields, they may be included in database fields, indexes or table primary keys. As a result, the personal or confidential information fields may be included in the data records for use as unique identifiers rather than for use for the specific information contained within. However, because the design of data tables may depend on these items of personal information, it may be difficult to adequately protect the included confidential information while maintaining data set integrity and utility.

BRIEF DESCRIPTION OF THE DRAWINGS

FIG. 2 illustrates an exemplary digit cypher for base 64 encoding.

FIG. 3 illustrates an exemplary sparse bit selection pattern.

FIGS. 5A-5D illustrate an exemplary data flow of conversion of subscriber-identifiable information into an obfuscated identifier.

DETAILED DESCRIPTION

Figure 1:
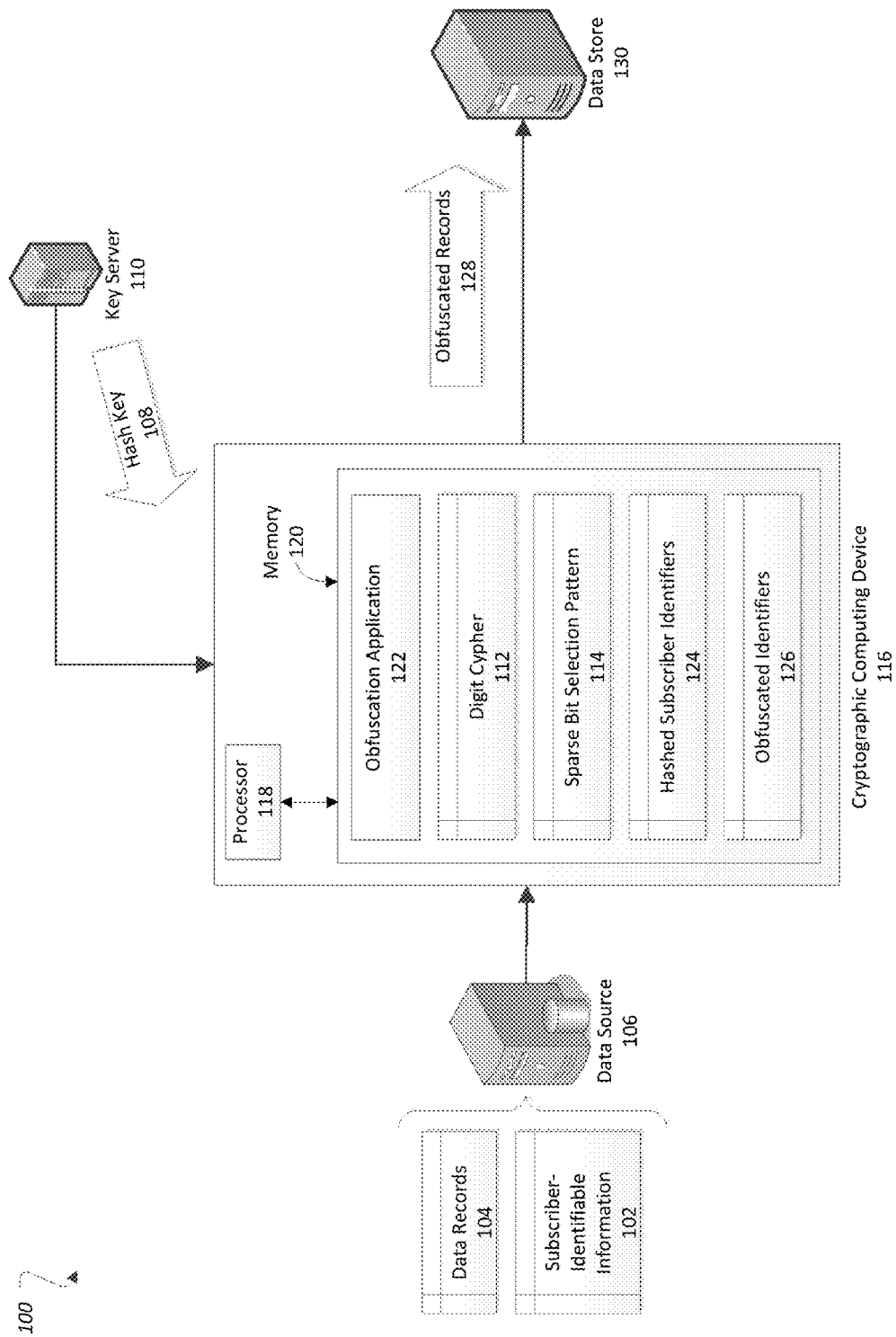
FIG. 1 illustrates an exemplary system for digest obfuscation for data cryptography.

A hashing algorithm may be designed to produce an output digest of a specified length from an input value (e.g., 256 bits, 512 bits, etc.). Such output values may be useful for the creation of digital signatures, to create codes for authentication of messages, and to hash data such that it may be difficult to identify the original input value. While hashing algorithms may provide good security of input values, reversal techniques such as rainbow tables, brute-force attacks, and dictionary attacks may sometimes be effective to reverse hashed values into the original input data. For example, many one-way hash algorithms in use today have documented inputs and corresponding outputs intended for use in verifying the accuracy of the hashing algorithm as implemented in code. An adversary could attempt to determine what hashing algorithm was used, and try to determine if a salt was used. If the adversary discovers the algorithm and knows there is no salt, then these documented values may be used by the adversary as a tool to attempt to reverse engineer hashing algorithms as implemented in various secure systems.

To provide further security of hashed values, digest obfuscation may be performed on hashed values output from a hashing algorithm. Digest obfuscation may include translating bits of the hashed value into bit units according to a sparse bit selection pattern, and performing a cypher on the resultant bit units according to a digit cypher, using the bit units as indices into the digit cypher to generate a resultant obfuscated value.

As compared to a hash algorithm, digest obfuscation does not modify an input value to generate an output value. Instead, digest obfuscation changes how the bits of the value may be represented in the output. Thus, digest obfuscation may be used with hash digest values, regardless of the algorithm of the hash, and may modify how the output of the hash will be represented so that it would be difficult for anyone to determine what hashing algorithm is being used. As digest obfuscation alters the output of the hash algorithm, a user will be unsuccessful in passing testing strings into the hashing algorithm in an attempt to identify output values identifying the hashing algorithm, because the obfuscated output value will not match the documented outputs. Thus, by performing digest obfuscation on hashed values, security of the hashed information may be further improved.

It should be noted that digest obfuscation includes different concepts than using a salting value in a hash algorithm. Use of salt values in hashing algorithms is a way to alter the output hashed values, but in so doing the salt also alters the inputs to the hashing algorithm, and therefore the digest itself is altered. Digest obfuscation does not change the input to the hashing algorithm, and therefore does not change the output digest. Instead, digest obfuscation changes how the data of the output digest may be represented in an output value.

While digest obfuscation may be used on plaintext values, digest obfuscation may provide greater benefits in securing values that are already hashed according to hash functions, such that the digest obfuscation may add an extra layer of security to the output of the hash digest to keep the actual digest value hidden.

FIG. 1 illustrates an exemplary system 100 for digest obfuscation for data cryptography. The system 100 may include one or more data sources 106 storing subscriber data records 104 including subscriber-identifiable information 102. The cryptographic computing device 116 may include a processor 118 that executes instructions stored on memory 120, including those of an obfuscation application 122. When executed by the processor 118 of the cryptographic computing device 116, the obfuscation application 122 may use a hash key 108 (e.g., obtained from a key server 110) to process the subscriber-identifiable information 102 into hashed subscriber identifiers 124. To further protect the hashed subscriber identifiers 124, the obfuscation application 122 may use a digit cypher 112 and sparse bit selection pattern 114 to transform the hashed subscriber identifiers 124 into obfuscated identifiers 126. The obfuscated identifiers 126 may then be used in the data records 104 in place of the subscriber-identifiable information 102 to create obfuscated records 128, thereby protecting the subscriber-identifiable information 102. The system 100 may take many different forms and includes multiple and/or alternate components and facilities. While an exemplary system 100 is shown in FIG. 1, the exemplary components illustrated of the system 100 are not intended to be limiting. Indeed, additional or alternative components and/or implementations may be used.

The subscriber-identifiable information 102 may include various elements of personal or confidential information about an individual or business that may be used to identify and potentially communicate with a subscriber. Exemplary types of subscriber-identifiable information 102 may include mobile device numbers, e-mail addresses, Twitter® handles, instant messaging accounts, social security numbers and driver's license numbers. As one example, it may be desirable for a subscriber and a network service provider to keep subscriber-identifiable information 102 private from advertisers, to avoid advertisers contacting its subscribers or maintaining databases of information including the subscriber-identifiable information 102.

The data records 104 may include information regarding subscribers (e.g., individuals, business, etc.) that may be generated or maintained in the ordinary course of business. As some possibilities, the data source 106 may include various types of information keyed to the subscriber-identifiable information 102, such as billing information of the subscribers, customer account information of the subscribers, usage information of the subscribers, and health information about the customers, as some examples. The data sources 106 may be configured to maintain the data records 104, and may be configured to provide the data records 104 to various entities.

A hash function is an algorithm configured to map input data of a variable length to output data of a fixed length. A cryptographic hash function may be a hash function configured to map input data into fixed output data such that the resultant output data obscures the input data and further that any change to the input data is likely to cause significant change to the resultant output value. The input data to be encoded may sometimes be referred to as a message, and the output value may be referred to as a hash value, a message digest, or simply a digest. A hash key 108 is an additional piece of information that may be provided to hash function along with the message to determine the digest, such that different hash keys 108 for the same message input cause the cryptographic hash function to generate different digest outputs. The key server 110 may be configured to maintain hash keys 108 and provide the hash keys 108 to clients with permission to receive the hash keys 108. In some cases, hash keys 108 may be determined according to random number generation, while in other cases hash keys 108 may be generated in other ways, such as by computing a product of two prime numbers.

The digit cypher 112 may include information useful for encoding data elements by substitution. The digit cypher 112 may include a set of values, such that a data element having a particular index value may be substituted for the data element appearing at that index in the set of values, thereby cyphering the data element. To reverse the cypher performed on the data element, a reverse substitution may be performed provided that the digit cypher 112 is available. In many examples, the digit cypher 112 may include a mapping of each possible input value to a unique output value.

FIG. 2 illustrates an exemplary digit cypher 112 for base 64 encoding. For each input value 202 of the encoding, the digit cypher 112 specifies a corresponding output value 204. The exemplary base 64 digit cypher 112 includes 64 entries (e.g., values 0 through 63), but digit cypher s 112 having more or fewer input values 202 and output values 204 are possible. As some examples, a digit cypher 112 for the English alphabet may include 26 entries, and a digit cypher 112 for hexadecimal may include only 16 entries.

Returning to FIG. 1, the sparse bit selection pattern 114 may include information useful for encoding data by bitwise transposition. The sparse bit selection pattern 114 may include a mapping of bit of an input value to bits of an output value. Because in many cases output values are represented in a particular base or radix, the sparse bit selection pattern 114 may be configured to include a bit mapping in units of bits corresponding to the numeric system chosen for output. For example, for an octal bit remapping of an input value, the sparse bit selection pattern 114 may remap bits of an input value into bit units of three bits each. As additional examples, for hexadecimal output values a pattern of four-bit units may be used, and for base 64 output values six-bit units may be used.

Notably, the groupings of the sparse bit selection pattern 114 output need not necessarily correspond to a length in bytes or a method of representation of the input value. Merely as one example, an input value of a certain number of bytes represented for convenience in binary or as a base 16 hexadecimal value may be remapped into base 64 output values. However, depending on the output value numerical base, there may be instances where remainder bits of the input value may have to be addressed. For instance, when encoding a 256-bit input value into base 64 (e.g., parsing in groupings of 24-bits), 16 bits may remain at the end of processing, but 16 bits will not map cleanly into six-bit base 64 units. As one way to address these situations, these remainder bits may be unevenly remapped or split up into units. For example, the remainder bits may be grouped into one 6-bit, and two 5-bit units to generate three base 64 output values. Or, the remainder bits may be grouped into two 6-bit units and one 4-bit unit, as another example.

It should also be noted that the selected bits for a given output value may be in any order, and do not have to be mapped from the input value in ascending order only or descending order only. For example, a hexadecimal output value may be generated by selecting bits 2, 23, 7 and 10 of an input value. Once a sparse bit selection pattern 114 has been selected for a particular output value (or values), to later reverse hash the value (or hash the same input value again) the sparse bit selection pattern 114 must remain fixed and available. For example, if the first output character uses bits 2, 23, 7 and 10 from an input value, then, to facilitate reversing of the output or consistent generation of the output, the first output character should be noted as including bits 2, 23, 7 and 10 of the original value.

Other rules may be used alone or in combination for the generation of the sparse bit selection pattern 114. As one example, in some implementations the sparse bit selection pattern 114 may be generated such that no two selected bits of an input value are adjacent to one another in an output value. As another example, to avoid increasing the likelihood of collisions and weakening the underlying hashing algorithm, in most implementations no specific bit of a given input value may be mapped to more than one bit of an output value.

FIG. 3 illustrates an exemplary sparse bit selection pattern 114. For each input data bit 302 of a value to be translated, the sparse bit selection pattern 114 specifies a corresponding output bit unit 304 and a bit unit location 306 within the output bit unit 304. In the exemplary sparse bit selection pattern 114, the bits of a 32-bit value are mapped into the bits of eight consecutive 4-bit output bit units 304 (referred to in the example as A, B, C, D, E, F, G and H, respectively). For example, the first, second, third, and forth bits of the first output bit unit 304 specified by the sparse bit selection pattern 114 (e.g., element A) may be composed of bits 7, 19, and 13 of an input value, respectively. As another example, the second output bit unit 304 (e.g., element B) may be composed of bits 31, 4, 21 and 6, respectively. While the exemplary sparse bit selection pattern 114 includes 32 input data bits 302 mapped to eight 4-bit output bit units 304, sparse bit selection patterns 114 may include more or fewer input data bits 302, as well as larger or smaller output bit units 304 (including output bit units 304 of varying size). Moreover, to translate longer values, a sparse bit selection pattern 114 may be applied multiple times to different portions of a value (e.g., applied to the first 32-bits of a 64-bit value and then to the second 32-bits of a 64-bit value).

As a specific example of the use of the exemplary sparse bit selection pattern 114, the sparse bit selection pattern 114 of FIG. 3 may be utilized to allow for the translation of a 32-bit value represented in Table 1 as follows:

TABLE 1

| Input Value | B | A | 7 | 8 | 1 | 6 | B | F |
|---|---|---|---|---|---|---|---|---|
| Input Data Bits | 1011 | 1010 | 0111 | 1000 | 0001 | 0110 | 1011 | 1111 |
| Output Bit Unit | FCHD | BGBA | DGEC | EAHF | DGHA | GBCD | EAEF | CFHB |
| Output Bit Unit Location | 4134 | 2341 | 1423 | 3412 | 3142 | 2322 | 1341 | 4321 |
| Output Value Bits | 0010 | 1111 | 1110 | 1000 | 1111 | 1101 | 1000 | 0110 |
| Output Value | 2 | F | E | 8 | F | D | 8 | 6 |

Returning again to FIG. 1, the cryptographic computing device 116 may include a processor 118 that executes instructions stored on memory 120, including those of an obfuscation application 122. The obfuscation application 122 may be configured to receive the data records 104, and to perform operations on the data records 104 to hash and obfuscate the subscriber-identifiable information 102. For instance, the obfuscation application 122 may be configured to use a hash key 108 received from a key server 110 to generate hashed subscriber identifiers 124 from the cleartext subscriber-identifiable information 102 fields of the data records 104. The obfuscation application 122 may be further configured to obfuscate the hashed subscriber identifiers 124 into obfuscated identifiers 126 using a digit cypher 112 and a sparse bit selection pattern 114. The obfuscation application 122 may be further configured to replace the subscriber-identifiable information 102 of the data records 104 with the obfuscated identifiers 126. The data records 104 with these replacements may be referred to as obfuscated records 128. The obfuscated records 128 may be stored in the data source 106, or in another data store 130. Further details of the processing performed by the obfuscation application 122 are discussed in detail below.

Figure 4:
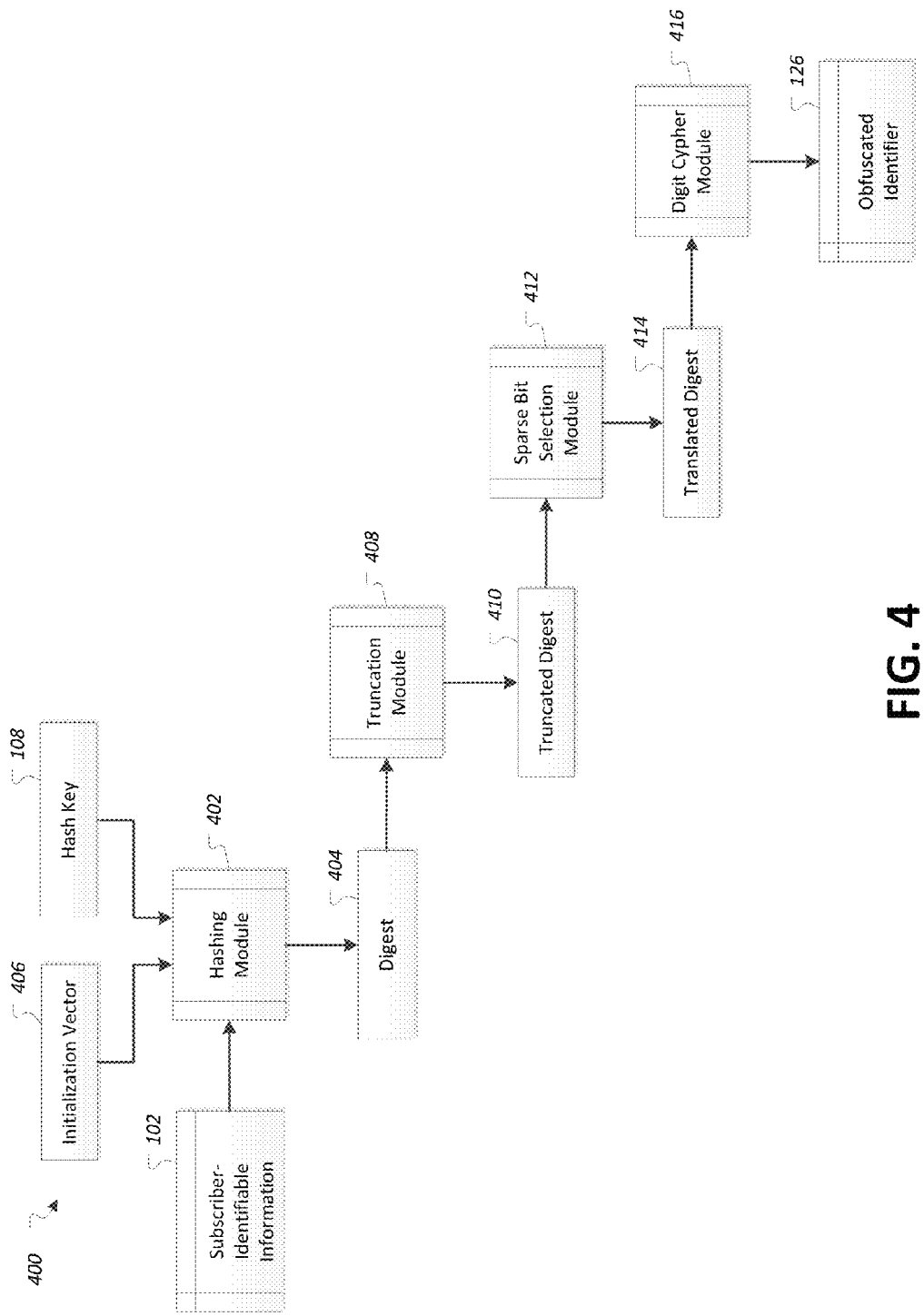
FIG. 4 illustrates an exemplary data flow of a modularization of the obfuscation configured for generating obfuscated identifiers to use in place of subscriber-identifiable information.

FIG. 4 illustrates an exemplary data flow 400 of a modularization of the obfuscation application 122 configured for generating obfuscated identifiers 126 to use in place of subscriber-identifiable information 102. The data flow 400 may be performed by the obfuscation application 122 executed by a processor 118 of the cryptographic computing device 116. Although one example of the modularization of the obfuscation application 122 is illustrated and described, it should be understood that the operations thereof may be provided by fewer, greater, or differently named modules.

The obfuscation application 122 may utilize a hashing module 402 implementing a cryptographic hashing function or procedure designed to encrypt input data using mathematical operations. The hashing module 402 may be configured to receive an item of subscriber-identifiable information 102 (e.g., a ten digit MDN) and to provide a fixed-size digest 404 from which the subscriber-identifiable information 102 may not be readily determined. Exemplary hashing algorithm algorithms may include SHA-0, SHA-1, SHA-2 (e.g., SHA-256, SHA-512), SHA-3, and MD5, as some non-limiting possibilities. An exemplary length of digest 404 suitable for use with ten digit MDNs may be 256 bits in length (e.g., such as the digests 404 generated by SHA-256), however different lengths of digest 404 may be used for MDNs or for other types of subscriber-identifiable information 102. The hashing module 402 may be designed such that a small change in the input string produces a significantly different digest 404. In some cases, to seed an algorithm used by the hashing module 402, an initialization vector 406 may be utilized by the hashing module 402 to hash the first item or items of subscriber-identifiable information 102. The initialization vector 406 may be determined, for example, by way of a random number generation.

The obfuscation application 122 may also utilize a hash key 108 to further protect the hashed subscriber identifiers 124. The hash key 108 may remain relatively fixed to facilitate consistent generation of the hashed subscriber identifiers 124. The hash key 108 remaining fixed means that the hash digest 404 produced will remain constant until the hash key 108 is changed. For example, a hash key 108 of "phHqefwopL7XBwzF0H8ayfv2Yva+135sIL8" may produce a digest 404 of "i80kQbGw4scSrwrzGVs" for an MDN of 1234567809 (e.g., the subscriber-identifiable information 102), regardless of when the digest 404 is determined. Thus, so long as the algorithm of the hashing module 402 and the value of the hash key 108 each remains unchanged, the digest 404 generated by the hashing module 402 for the same subscriber-identifiable information 102 will remain constant.

In some cases, the obfuscation application 122 may further utilize a truncation module 408 to generate a truncated digest 410 from the digest 404. In some cases, different lossy operations may be performed instead of or in addition to truncation to create the truncated digest 410 (e.g., selection of or removal of every nth bit, use of middle bits, use of terminal bits, etc.). Since the truncated digest 410 does not contain the entire digest 404 value, it would be extremely difficult for a hashed truncated digest 410 to be reversed back into the digest 404, let alone into the original value (e.g., the subscriber-identifiable information 102). Thus, the truncation module 408 may be used to increase security of the digest 404 value.

Rather than decreasing security, however, a potential concern for use of the truncation module 408 on the digest 404 is collisions, where a truncated digest 410 may ambiguously be computed from more than one element of subscriber-identifiable information 102. Nevertheless, this collision risk may be mitigated by including enough bits of the digest 404 in the truncated digest 410 to make such a collision highly unlikely. As an example, utilizing the first 23 bytes (184 bits) of a 256-bit digest 404 may provide for good security while at the same time avoiding the likelihood of subscriber-identifiable information 102 collisions in the truncated digest 410.

The obfuscation application 122 may further utilize a sparse bit selection module 412 to generate a translated digest 414 from the digest 404 (or from a truncated digest 410 in cases in which a truncation module 408 is employed). The translated digest 414 may include bit units including a number of bits corresponding to a digit cypher 112 to be used to generate a final output. For instance, for a digit cypher 112 using base 64, the bit units may include six bits. To determine the bit units of the translated digest 414, the sparse bit selection module 412 may utilize a sparse bit selection pattern 114 to determine which input data bits 302 of the digest 404 to transpose into what bit unit locations 306 of which output bit units 304.

The obfuscation application 122 may also utilize a digit cypher module 416 to generate an obfuscated identifier 126 from the translated digest 414. The digit cypher module 416 may look up each of the bit units of the translated digest 414 as input values 202 to a digit cypher 112, where the digit cypher 112 includes a mapping of input values 202 to output values 204. The resultant output values 204 may be combined in order to form the obfuscated identifier 126.

FIGS. 5A-5D illustrate an exemplary data flow 500 of conversion of subscriber-identifiable information 102 into an obfuscated identifier 126. In the example data flow 500, a subscriber-identifiable information 102 element "abc" is processed into an obfuscated identifier 126 represented in base-64. The data flow 500 may be performed using the obfuscation application 122 executed by a processor 118 of the cryptographic computing device 116.

Figure 5A:
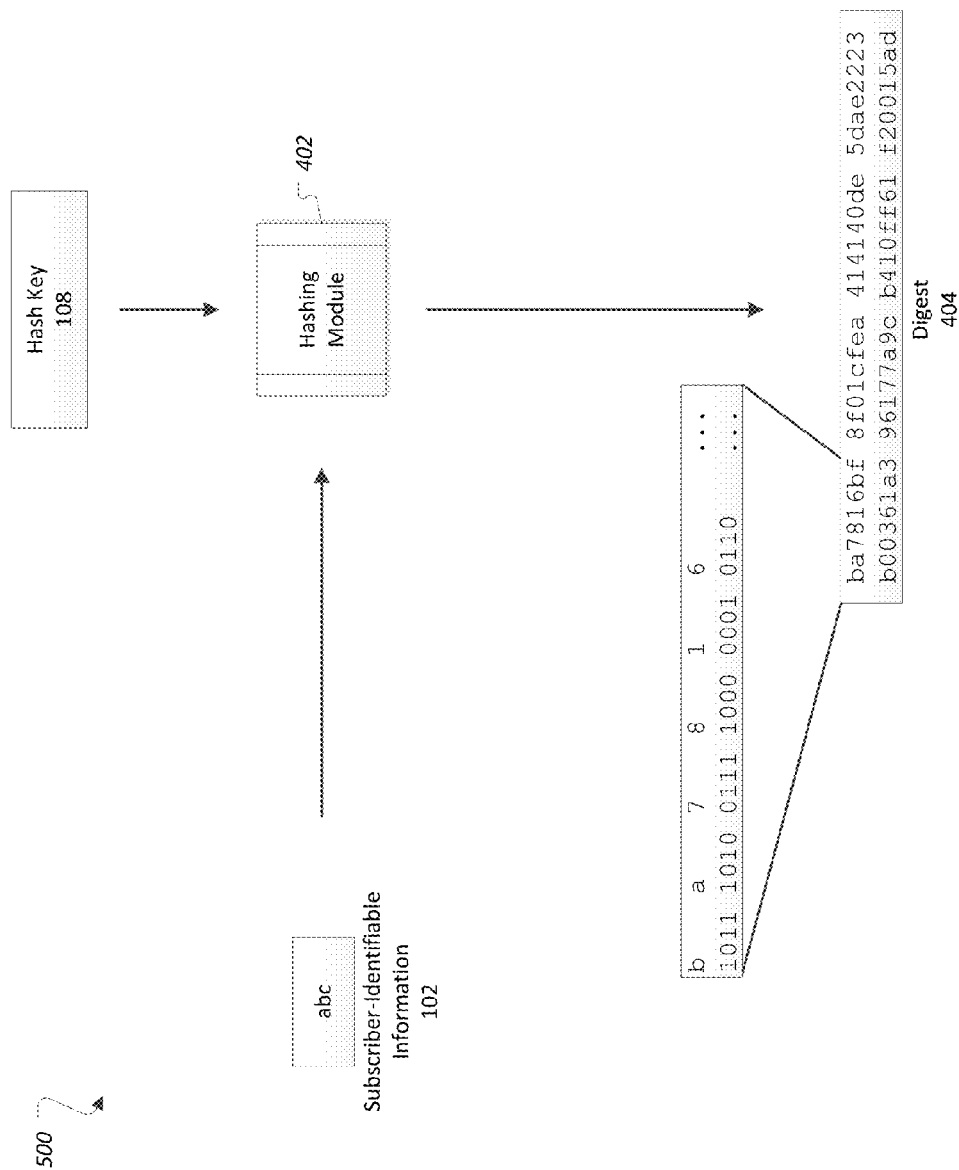
Figure 5B:
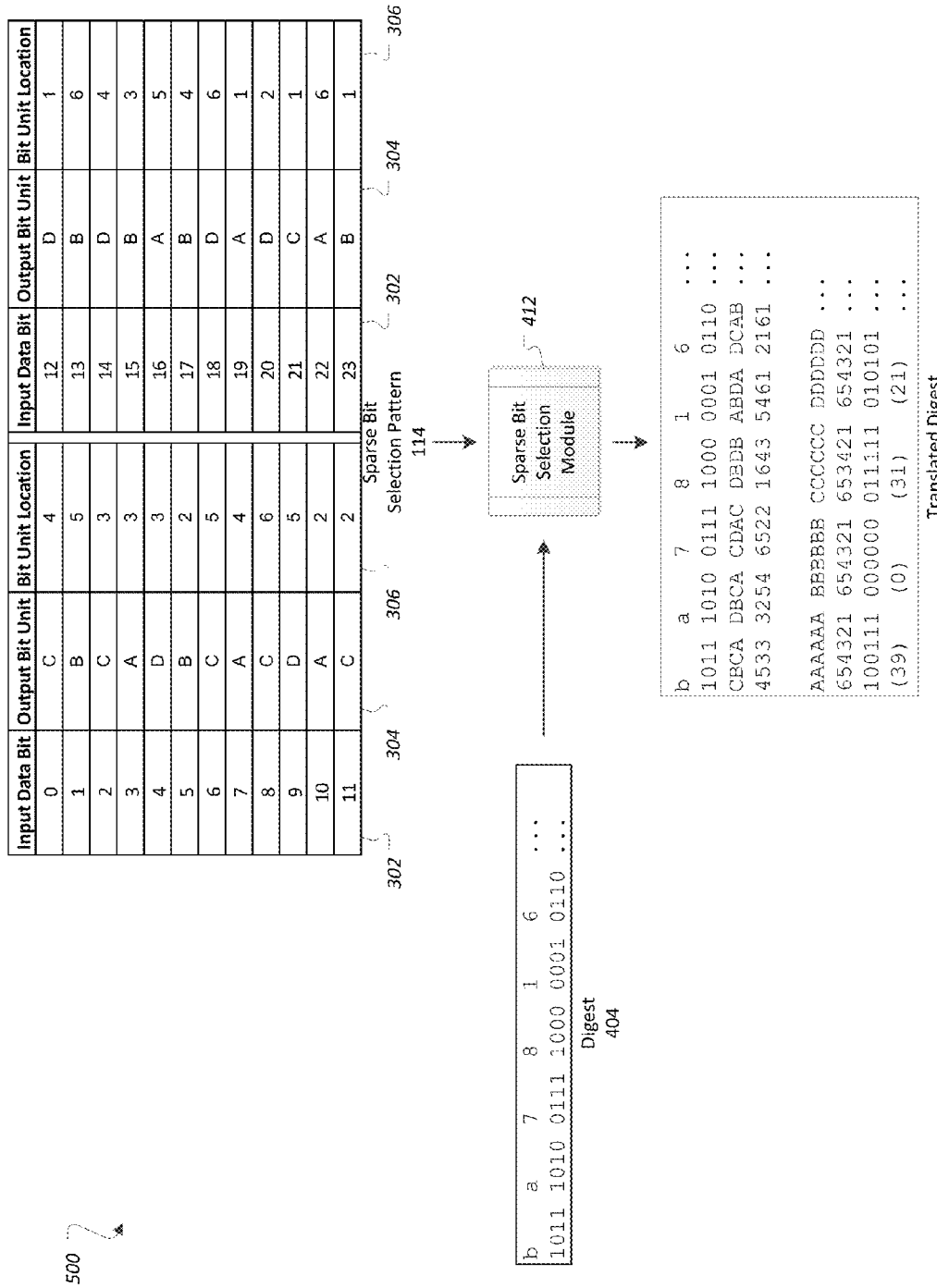
Figure 5D:
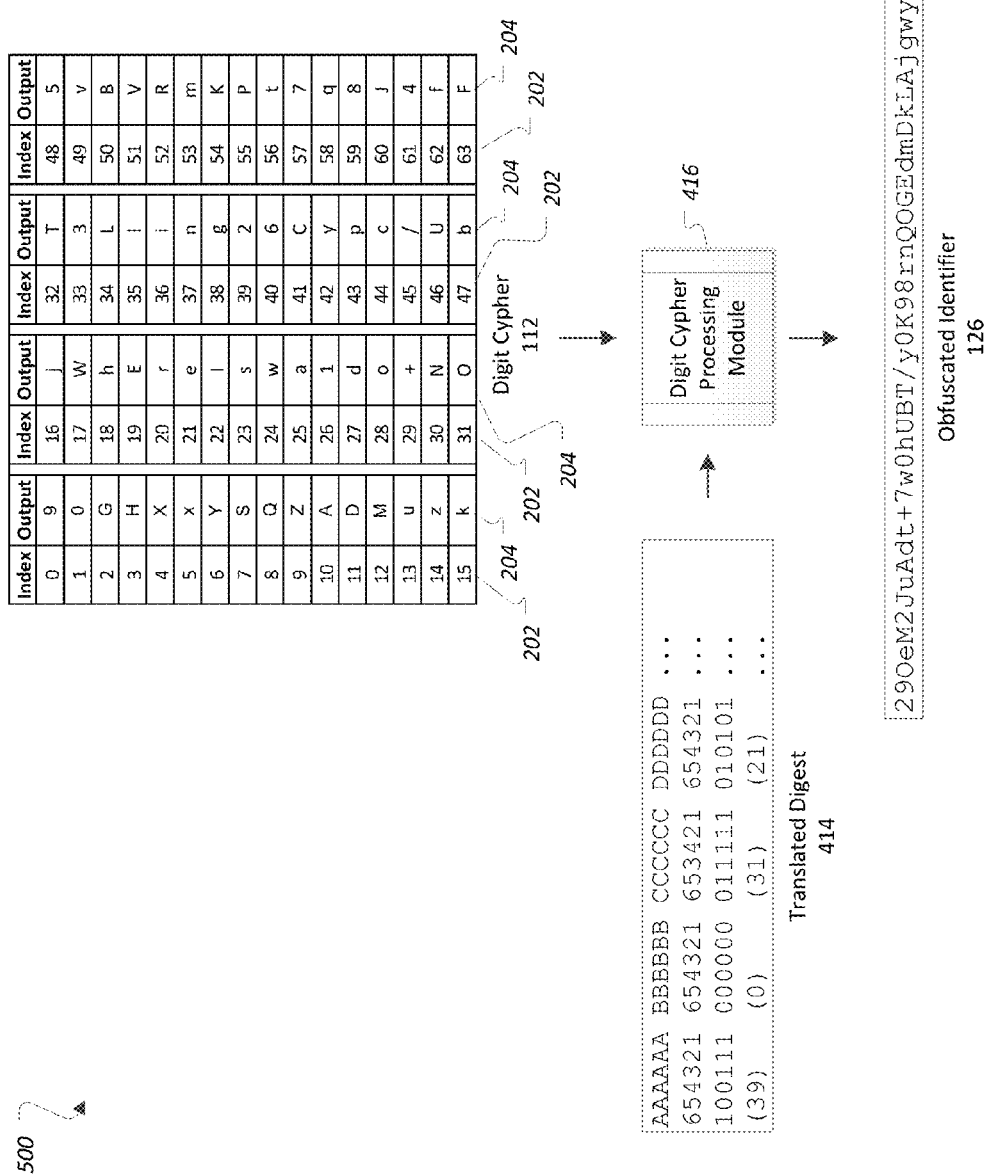

In FIG. 5A, the element of subscriber-identifiable information 102 is shown as including the information "abc". A hashing module 402 of the obfuscation application 122 may process the subscriber-identifiable information 102 into a digest 404. For example, the hashing module 402 may utilize the SHA 256 hashing algorithm and a hash key 108 to generate the illustrated 256-bit digest 404. While in typical use, the entire digest 404 would be processed (or an entire truncated digest 410 shorted by use of the truncation module 408), to facilitate the illustration of the remainder of the data flow 500, the FIGS. 5B and 5D illustrate the processing of the first 24 bits of the 256-bit digest 404 (and FIG. 5C of the last 16 bits). Also for sake of explanation, these bits are further broken out in the FIGS. 5A-5D to better explain the data flow 500.

In FIG. 5B, a sparse bit selection module 412 of the obfuscation application 122 processes the digest 404 into a translated digest 414, using a sparse bit selection pattern 114. The sparse bit selection pattern 114 may be configured to include 6-bit output bit units 304, to allow for the generation of an obfuscated identifier 126 in base-64. More specifically, the generation may be performed based on the bits of the digest 404, the input data bit 302 to output bit unit 304 mapping of the sparse bit selection pattern 114, and the bit unit locations 306 of the sparse bit selection pattern 114. As shown in the sparse bit selection pattern 114, bits 19, 10, 3, 7, 16 and 22, respectively, are used to form the first 6-bit unit of translated digest 414. Accordingly the value of the first 6-bit unit of the translated digest 414 (referred to as "A" in the Figure), is "100111" in binary, corresponding to the decimal value "39".

The translation of the digest 404 continues through the remainder of the digest 404 to generate the entire translated digest 414. For example, the 24 pattern of the illustrated sparse bit selection pattern 114 may be repeated ten times for the first 240 bits of the digest 404, with special processing to map the remaining 16 bits of the digest 414 into the translated digest 414 (or other amount of bits if truncation is performed to the digest 414 by the truncation module 408). A second sparse bit selection pattern 114 may be used to perform the mapping of the remaining 16 bits, such as illustrated in FIG. 5C. Notably, as there are only 16 bits of data to include in 18 bits of data, two bits of the second sparse bit selection pattern 114 will not have a corresponding value in the digest 404. In the example, most significant bits of the second and third output values in this example are mapped to always be zero, although in other examples other bits could be used, and bits could be mapped to be always one rather than always zero.

In FIG. 5D, a digit cypher module 416 of the obfuscation application 122 processes the translated digest 414 into an obfuscated identifier 126, using a digit cypher 112. The digit cypher module 416 may determine the values of the obfuscated identifier 126 by mapping the values of the translated digest 414 as input values 202 into the digit cypher 112, to determine the corresponding output values 204. For example, the first 6-bit unit of translated digest 414 in the illustrated example has the value of "39". Thus, the first unit of the obfuscated identifier 126 corresponding to the input value "39" is the output value 204 of "2". Similarly, the second value of the obfuscated identifier 126 is "9", corresponding to the input value "0", and the third value of the obfuscated identifier 126 is "O", corresponding to the input value "31". The processing of the translated digest 414 may continue through the remainder of the translated digest 414 to determine the entire obfuscated identifier 126. Thus, in the example, the resultant obfuscated identifier 126 for the input value "abc" may be the value of "29OeM2JuAdt+7w0hUBT/y0K98rnQOGEdmDkLAjgwyaw".

Figure 6:
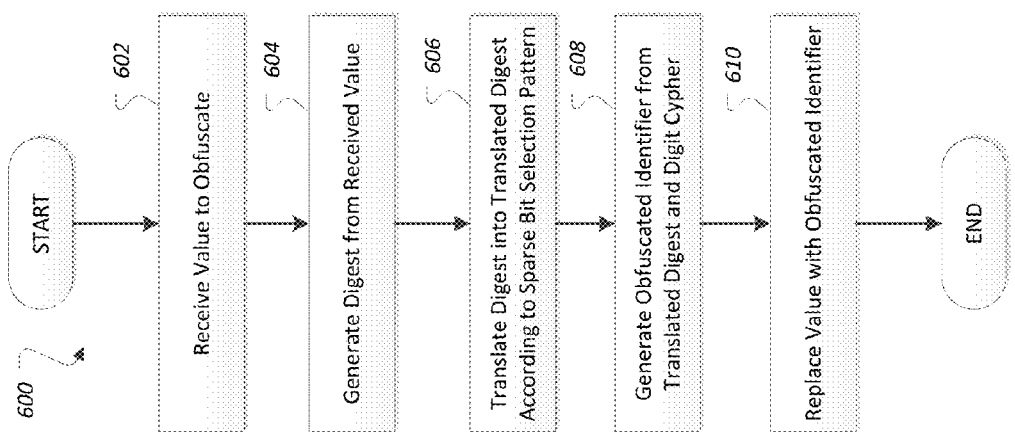
FIG. 6 illustrates an exemplary process for digest obfuscation for data cryptography.

FIG. 6 illustrates an exemplary process 600 for digest obfuscation for data cryptography. Similar to as discussed above with respect to the data flow 500, the process 600 may be performed using the obfuscation application 122 executed by a processor 118 of the cryptographic computing device 116.

In block 602, the obfuscation application 122 receives a value to obfuscate. For example, the obfuscation application 122 may receive or otherwise identify elements of subscriber-identifiable information 102 included in data records 104 received from or stored in a data source 106.

In block 604, the obfuscation application 122 generates a digest 404 based on the received value. For example, the obfuscation application 122 may utilize a hashing module 402 and a hash key 108 to process the subscriber-identifiable information 102 into a digest 404. The utilized hash key 108 may be received from a key server 110, and/or maintained in the memory 120 of the cryptographic computing device 116 for use in generating digests 404. In some cases to increase security of the digest 404 value, the obfuscation application 122 may further utilize a truncation module 408 to perform one or more lossy operations on the digest 404 to generate a truncated digest 410.

In block 606, the obfuscation application 122 generates a translated digest 414 from the digest 404 or truncated digest 410. For example, the obfuscation application 122 may utilize a sparse bit selection module 412 and a sparse bit selection pattern 114 to translate the digest 404 or truncated digest 410 into the translated digest 414. In some cases, a sparse bit selection pattern 114 shorter than the digest 404 or truncated digest 410 may be applied multiple times to translate the bits of the digest 404 (e.g., applied to the first 32-bits of a 64-bit value and then to the second 32-bits of a 64-bit value). In some cases, a second sparse bit selection pattern 114 may be applied to allow for the mapping of remainder bits of the digest 404 (e.g., for the remaining 16-bits of a 256-bit value being processed using a 24-bit sparse bit selection pattern 114).

In block 608, the obfuscation application 122 generates an obfuscated identifier 126 from the translated digest 414. For example, the obfuscation application 122 may utilize a digit cypher module 416 and a digit cypher 112 to substitute appropriate output values 204 for the input values 202 of the translated digest 414.

In block 610, the obfuscation application 122 replaces the value to obfuscate with the obfuscated identifier 126. For example, the obfuscation application 122 may replace subscriber-identifiable information 102 in the data records 104 with the obfuscated identifier 126. The data records 104 with these replacements may be referred to as obfuscated records 128. The obfuscated records 128 may be stored in the data source 106, or in another data store 130. The obfuscated records 128 may accordingly be used in place of the data records 104 to protect the subscriber-identifiable information 102, while at the same time retaining integrity of the processed data. After block 610, the process 600 ends.

Thus, an obfuscation application 122 may perform digest obfuscation on input data to generate a resultant obfuscated value. The digest obfuscation may include translating bits of the hashed value into bit units according to a sparse bit selection pattern 114, and performing a cypher on the resultant bit units according to a digit cypher 112, using the bit units as indices into the digit cypher 112 to generate a resultant obfuscated identifier 126. By performing digest obfuscation, an additional layer of security may be added to existing cryptographic algorithms, making it more difficult to determine the original value that was hashed. For example, digest obfuscation may help a system to defeat an ability of an adversary to use rainbow tables to crack the hash, even if the adversary were to obtain knowledge of a hashing algorithm and salt in use in the system.

As one use, digest obfuscation may be applied to subscriber-identifiable information 102 in data records 104 of a marketing system that generates revenue by selling consumer data to retailers, while at the same time concealing the identity of the consumers. In such systems, to protect customers whose data records 104 may be used, any piece of subscriber-identifiable information 102 that may reveal an identity of a consumer may be obfuscated to keep the underlying data confidential. The subscriber-identifiable information 102 to be protected may include, as some examples, customer name, demographics or phone number. The resultant data records 104 with obfuscated identifiers 126 in place of the subscriber-identifiable information 102 may be referred to as obfuscated records 128, and may be used for marketing purposes in place of the original data records 104. Various algorithms may be used to secure the customer information such as hashing using an added salt value. Digest obfuscation may further be used in addition to such hashing algorithms to provide an additional layer of security as described in detail above. By using the digest obfuscation techniques, subscriber-identifiable information 102 may now be provided to retailers in the form of obfuscated identifiers 126, which do not reveal the identity of the underlying individual consumers. Despite being unable to identify the actual consumers, retailers may still benefit from having other information about the consumers in the obfuscated records 128, such as age, gender, salary, etc., to help marketers identify and target appropriate customers for a given marketing campaign.

As another use, digest obfuscation may be utilized to protect strategic military coordinates to reduce casualties from friendly fire, and increase real-time knowledge of troop and other weaponry locations for strategic advantage over adversaries. In such cases, data records 104 to be secured may be received from GPS devices placed in aircraft, tanks, ships, drones, other vehicles, or in soldier uniforms. Before the coordinate data records 104 are transmitted, digest obfuscation may be applied to the data records 104 to alter the coordinate or asset name information, reducing the risk of strategic locations being revealed to adversaries. Thus, military commands may be able to freely transmit GPS coordinates to and from various command centers to obtain real-time positions of troops and weaponry, and troops may be alerted to other approaching "friendly" troops to avoid casualties, while at the same time protecting the identity of the specific assets or locations being tracked.

As a further use, digest obfuscation may be utilized to safeguard consumer credit card numbers, social security numbers, and other subscriber-identifiable information 102 from fraud and identity theft. In such cases, data records 104 to be secured may be received from or located at retailers, banks, and government agencies storing sensitive information within their networks. Any sensitive information in the data records 104 may be made secure by applying digest obfuscation to further obfuscate output of a cryptographic hash function used to make the data unrecognizable. Thus, in a case where a purportedly secure network is broken into, and the obfuscated records 128 are downloaded by an intruder, the obfuscated records 128 secured with hashing and digest obfuscation may be useless to the intruder.

As yet another use, as carriers convert their handsets to including GPS capability, digest obfuscation may be utilized to protect the location of an individual by hashing and obfuscating his or her GPS location coordinates. To do so, the GPS coordinates may be converted into a digest 404, and then obfuscated into an obfuscated identifier 126 using digest obfuscation before being transmitted. Performing digest obfuscation in these cases may accordingly allow the individual whose subscriber-identifiable information 102 is being provided in the obfuscated records 128 to feel more secure that his or her identity is secure.

As yet a further use, digest obfuscation may be applied to sensitive subscriber-identifiable information 102 stored in databases, to protect the sensitive information from social engineering techniques or curious or malicious employees. Databases may contain data records 104 including subscriber-identifiable information 102 about consumers, such as name, phone numbers, credit card numbers, and social security numbers. Other information, such as call detail records, may also exist in the data records 104. Database tables and/or views, which may be accessed by many employees, may be secured by applying the aforementioned hashing and digest obfuscation techniques to the subscriber-identifiable information 102, and storing the obfuscated identifiers 126 in the database in place of the subscriber-identifiable information 102. Thus, obfuscated values may be used in queries in place of the subscriber-identifiable information 102, such that when database query results are displayed, the subscriber-identifiable information 102 itself may not be determined.

In general, computing systems and/or devices, such as the cryptographic computing device 116, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, notebook, laptop, or handheld computer, or some other computing system and/or device.

Computing devices, such as the cryptographic computing device 116, generally include computer-executable instructions, such as the instructions of the obfuscation application 122, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Objective C, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein, such as the data source 106 and the data store 130, may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. In some cases, the data store may be local and accessed locally. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A computing device having a hardware processor that provides operations comprising:
    receiving a target value to be obfuscated in data records received from a data source;
    hashing the target value using a hashing module to create a hashed value;
    translating, by the hardware processor, bits of the hashed value according to a sparse bit selection pattern that specifies input data bits, output bit units for the respective input data bits, and bit unit locations within the respective output bit units, the sparse bit pattern including a translation of bits of the hashed value into reordered bit unit groupings sized according to a numeric base of a digit cypher;
    generating, by the hardware processor, an obfuscated value using the translated bit unit groupings of the hashed value as indices into the digit cypher, the digit cypher including a mapping of the indices to output values in the numeric base;
replacing the target value in the data records with the obfuscated value and protecting subscriber-identifiable information,
wherein the target value includes a mobile device number, the hashing is performed using SHA-256, and one of: (i) the numeric base is base 64, and the bit unit groupings of the sparse bit pattern include groupings of six bits, and (ii) the numeric base is base 16, and the bit unit groupings of the sparse bit pattern include groupings of four bits.

2. A computing of claim 1, further configured to provide operations comprising applying a truncation to an output of the hashing module to create a truncated digest value to use as the hashed value.

3. The computing device of claim 1, further configured to provide operations comprising creating the sparse bit selection pattern based on rules including that (i) for any given output value, no two selected bits of the hashed value are adjacent to one another and (ii) no specific bit of a given input value is mapped to more than one bit of an output value.

4. The computing device of claim 1, further configured to provide operations comprising at least one of: (i) applying the sparse bit selection pattern to a plurality of portions of the hashed value exceeding the length of the sparse bit selection pattern; and (ii) applying a second sparse bit selection pattern to remainder bits of the hashed value of insufficient length to use the sparse bit selection pattern.

5. The computing device of claim 1, the digit cypher including each of the possible output values for the numeric base of the digit cypher.

6. A method, comprising:
receiving a target value to be obfuscated in data records received from a data source:
hashing the target value using a hashing module to create a hashed value;
translating, by a hardware processor of a computing device, bits of the hashed value according to a sparse bit selection pattern that specifies input data bits, output bit units for the respective input data bits, and bit unit locations within the respective output bit units, the sparse bit pattern including a translation of bits of the input value into reordered bit unit groupings sized according to a numeric base of a digit cypher;
generating, by the hardware processor of the computing device, an obfuscated value using the translated bit unit groupings of the hashed value as indices into the digit cypher, the digit cypher including a mapping of the indices to output values in the numeric base;
replacing the target value in the data records with the obfuscated value and protecting subscriber-identifiable information,
wherein the target value includes a mobile device number, the hashing is performed using SHA-256, and one of: (i) the numeric base is base 64, and the bit unit groupings of the sparse bit pattern include groupings of six bits, and (ii) the numeric base is base 16, and the bit unit groupings of the sparse bit pattern include groupings of four bits.

7. The method of claim 6, further comprising applying a truncation to an output of the hashing module to create a truncated digest value to use as the hashed value.

8. The method of claim 6, further comprising creating the sparse bit selection pattern based on rules including that (i) for any given output value, no two selected bits of the hashed value are adjacent to one another and (ii) no specific bit of a given input value is mapped to more than one bit of an output value.

9. The method of claim 6, further comprising at least one of: (i) applying the sparse bit selection pattern to a plurality of portions of the hashed value exceeding the length of the sparse bit selection pattern; and (ii) applying a second sparse bit selection pattern to remainder bits of the hashed value of insufficient length to use the sparse bit selection pattern.

10. The method of claim 6, the digit cypher including each of the possible output values for the numeric base of the digit cypher.

11. A non-transitory computer-readable medium tangibly embodying computer-executable instructions that are executable by a hardware processor of a computing device to provide operations comprising:
receiving a target value to be obfuscated in data records received from a data source;
hashing the target value using a hashing module to create a hashed value; and
translating, by the hardware processor, bits of the hashed value according to a sparse bit selection pattern that specifies input data bits, output bit units for the respective input data bits, and bit unit locations within the respective output bit units, the sparse bit pattern including a translation of bits of the input value into reordered bit unit groupings sized according to a numeric base of a digit cypher;
generating, by the hardware processor, an obfuscated value using the translated bit unit groupings of the hashed value as indices into the digit cypher, the digit cypher including a mapping of the indices to output values in the numeric base;
replacing the target value in the data records with the obfuscated value and protecting subscriber-identifiable information,
wherein the target value includes a mobile device number, the hashing is performed using SHA-256, and one of: (i) the numeric base is base 64, and the bit unit groupings of the sparse bit pattern include groupings of six bits, and (ii) the numeric base is base 16, and the bit unit groupings of the sparse bit pattern include groupings of four bits.

12. The computer-readable medium of claim 11, further configured to provide operations comprising applying a truncation to an output of the hashing module to create a truncated digest value to use as the hashed value.

13. The computer-readable medium of claim 11, further configured to provide operations comprising creating the sparse bit selection pattern based on rules including that (i) for any given output value, no two selected bits of the hashed value are adjacent to one another and (ii) no specific bit of a given input value is mapped to more than one bit of an output value.

14. The computer-readable medium of claim 11, further configured to provide operations comprising at least one of: (i) applying the sparse bit selection pattern to a plurality of portions of the hashed value exceeding the length of the sparse bit selection pattern; and (ii) applying a second sparse bit selection pattern to remainder bits of the hashed value of insufficient length to use the sparse bit selection pattern.

15. The computer-readable medium of claim 11, the digit cypher including each of the possible output values for the numeric base of the digit cypher.

* * * * *